United States Patent [19]
Hughes, Jr.

[11] Patent Number: 5,967,706
[45] Date of Patent: Oct. 19, 1999

[54] HIGH SPEED MILLING CUTTER

[75] Inventor: Ralph W. Hughes, Jr., Martinez, Ga.

[73] Assignee: Kennametal Inc., Latrobe, Pa.

[21] Appl. No.: 09/149,693

[22] Filed: Sep. 8, 1998

[51] Int. Cl.⁶ ........................................... B23C 5/20
[52] U.S. Cl. .............................. 407/41; 407/46; 407/49; 407/53
[58] Field of Search ................... 407/41, 30, 33, 407/35, 46, 43, 49, 53, 56

[56] References Cited

U.S. PATENT DOCUMENTS

| | | | |
|---|---|---|---|
| 1,924,887 | 8/1933 | Severson | 29/105 |
| 2,538,909 | 1/1951 | Miller | 407/41 X |
| 2,751,663 | 6/1956 | Leuzinger | 29/105 |
| 3,359,612 | 12/1967 | Mina | 29/105 |
| 3,535,759 | 10/1970 | Mueller | 407/41 X |
| 3,733,665 | 5/1973 | Spriggs | 29/105 |
| 4,105,357 | 8/1978 | Kehl | 407/41 |
| 4,575,287 | 3/1986 | Oshnock et al. | 407/41 |
| 4,808,044 | 2/1989 | Tsujimura et al. | 407/41 X |
| 4,826,090 | 5/1989 | Orphall | 241/191 |
| 5,082,400 | 1/1992 | Shiratori et al. | 407/42 |
| 5,658,100 | 8/1997 | Deiss et al. | 407/35 |
| 5,716,167 | 2/1998 | Siddle et al. | 407/36 |

FOREIGN PATENT DOCUMENTS

3007322  9/1981  Germany ................ 407/41

Primary Examiner—Andrea L. Pitts
Assistant Examiner—Henry W. H. Tsai
Attorney, Agent, or Firm—Larry R. Meenan

[57] ABSTRACT

A milling cutter using a wedge to secure an insert within a pocket of the milling cutter wherein the wedge is tapered in both the axial direction and the radial direction. A screw urges the wedge within a tapered cavity to press the insert within the pocket along the axial wedge angle while rotation of the cutter creates centrifugal forces urging the wedge radially outward, thereby forcing the wedge against the radial wedge surface to further compress the insert within the pocket. The insert pocket may be extended to radially encompass the insert, thereby providing additional support against centrifugal forces for the insert.

26 Claims, 6 Drawing Sheets

HIGH SPEED MILLING CUTTER

BACKGROUND OF THE INVENTION

1. Field of the Invention

This invention relates to milling cutters and, more specifically, to a milling cutter having indexable inserts secured with a wedge-type clamp capable of high speed operation.

2. Description of the Prior Art

A major factor affecting the design of milling cutters utilizing indexable inserts about the periphery of the milling cutter body is the influence of centrifugal forces upon the indexable inserts and upon the hardware utilized to retain the indexable inserts within the milling cutter body. These centrifugal forces increase by the square of the rotational speed with a linear increase in rotational speed.

U.S. Pat. No. 3,733,665 discloses a rotary cutting tool utilizing a wedge clamp urging the insert against a pocket in the cutting tool. However, as the rotational speed of the cutter increases, the wedges which are restrained by pitch screws may move radially outward thereby lessening the compressive force upon the insert. At higher speeds the wedge may become disengaged from the insert thereby permitting the insert to fall from the cutter body.

U.S. Pat. No. 5,716,167 entitled "High Speed Cartridge Type Milling Cutter," assigned to Kennametal Inc. and hereby incorporated by reference, discloses a milling cutter utilizing a cartridge mounting mechanism having a dovetail configuration which is positively restrained within a matching dovetail configuration in the cutter body. Indexable inserts are connected to the cartridge utilizing tangentially mounted screws. While the insert cartridge may be restrained against outward radial movement during high rotational speeds, the mounting screw of the indexable inserts will be subjected to shear, and this will be a limiting factor in the rotational speed.

An object of the subject invention is to provide a milling cutter with indexable inserts clamped therein which is capable of securing the inserts within the milling cutter body such that the milling cutter body is tolerant of high speeds and such that the clamping force upon the insert by the milling cutter body increases as the rotational speed of the milling cutter increases.

BRIEF SUMMARY OF THE INVENTION

The invention is directed to a cutting tool comprising a cylindrical body with a front end and a back end and having a peripheral wall with a longitudinal axis and at least one insert mount assembly about the peripheral wall of the body. Each insert mount assembly is comprised of an insert pocket recessed within the peripheral wall at the front end of the tool and an insert positioned within the insert pocket, wherein the insert has a top face, a bottom face and a side wall therebetween which intersect with the top face to define a cutting edge. Each insert mount assembly is further comprised of a wedge cavity recessed within the wall and adjacent to the insert pocket at the front end of the tool and a wedge positioned within the wedge cavity having a foot for contacting the top face of the insert and urging the insert within the insert pocket with a clamping force. The wedge cavity has an inner surface, a wedging wall, and a stabilizing wall opposite the wedging wall. The walls of the wedge cavity converge in a direction from the front end to the back end of the body to define an axial wedge angle ($\alpha$) such that when the wedge, which has a wedging side and stabilizing side conforming to the wedging wall and stabilizing wall of the wedge, is moved toward the cavity inner surface, the foot of the wedge compresses against the face of the insert with increasing clamping force. Furthermore, the wedging wall and the stabilizing wall of the wedge cavity converge as they extend in a direction generally radial outward to the body to define a radial wedge angle ($\beta$) such that the wedge is captured and any radially outward movement of the wedge increases the clamping force upon the insert face.

The insert pocket may be generally radially oriented and partially enclosed along the periphery of the body to capture the insert in the radial direction.

Other objects and advantages of the present invention will become apparent and obvious from the study of the following description and accompanying drawings which are merely illustrative of such invention.

DETAILED DESCRIPTION OF THE EMBODIMENTS

Figure 1:
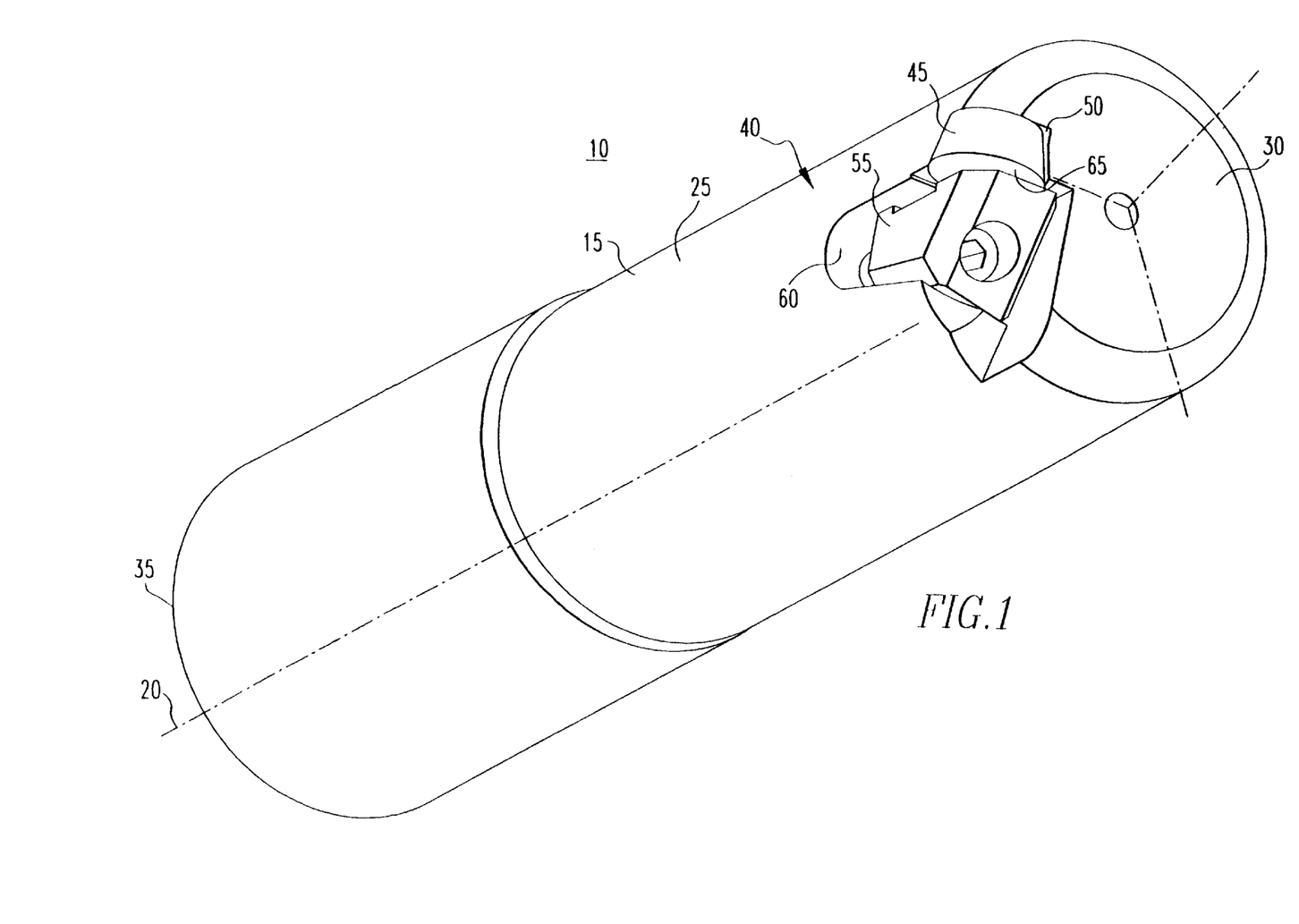
FIG. 1 illustrates a perspective view of the apparatus according to the present invention.

FIG. 1 illustrates a milling cutter 10 made up of a cylindrical body 15 about a longitudinal axis 20. As shown in FIG. 3, the cutting tool may include a bore 21 extending the length of the cylindrical body 15 along the longitudinal axis 20. The body 15 has a peripheral wall 25 thereabout and a front end 30 and a back end 35. At least one insert mount assembly 40 is recessed within the peripheral wall 25 of the body 15. In general, as illustrated in FIGS. 1 and 2, a cutting insert 45 is compressed within an insert pocket 50 by a wedge 55 which moves generally along the longitudinal axis 20 within a wedge cavity 60.

Figure 2:
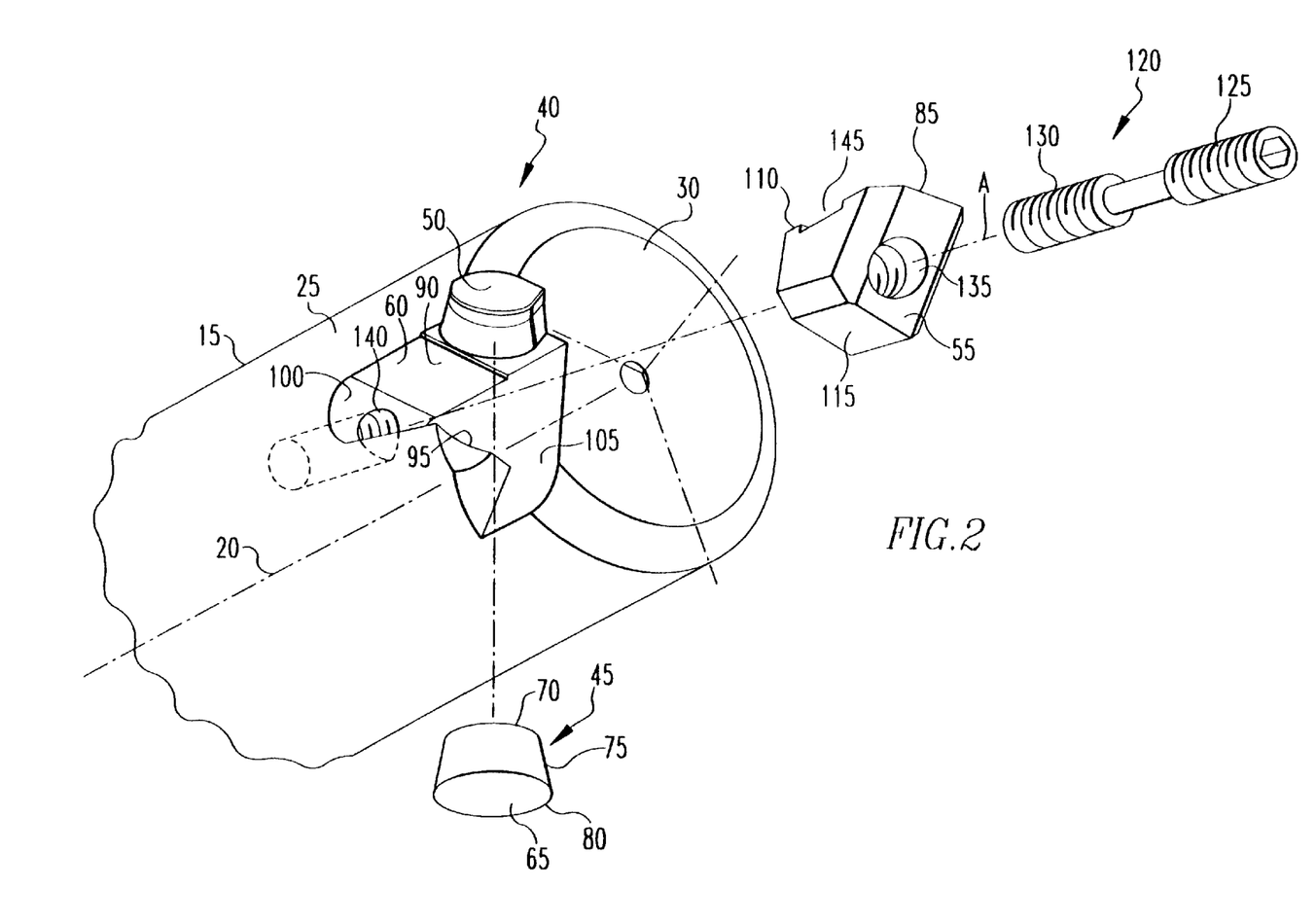
FIG. 2 illustrates an exploded perspective view of the end portion in FIG. 1.
Figure 3:
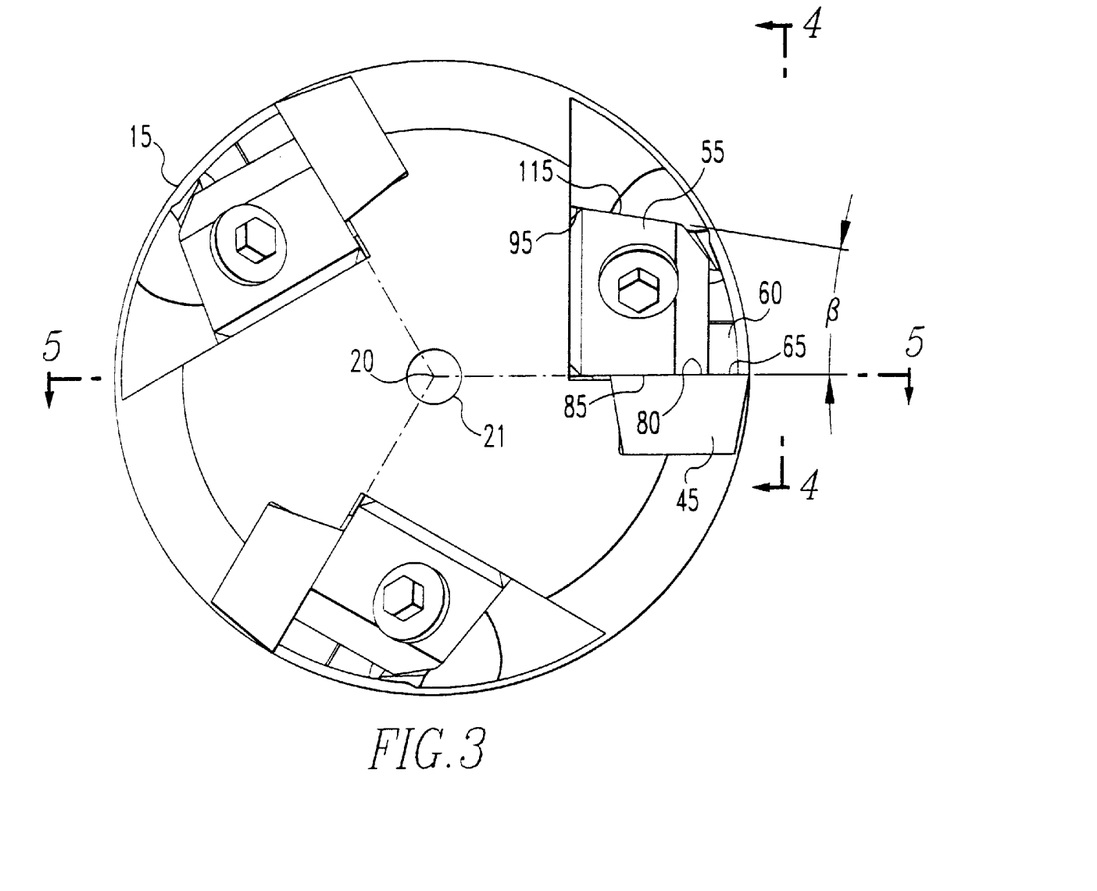
FIG. 3 illustrates a bottom view of the subject invention viewed from the right in FIG. 1 and with two insert mounting assemblies added.

As illustrated in the exploded perspective view of FIG. 2, the insert pocket 50 is recessed within the peripheral wall 25 at the front end 30 of the body 15. The insert 45 is positioned within the insert pocket 50 and has a top face 65 and a bottom face 70 with a side wall 75 therebetween. The side wall 75, which may be conical in shape, intersects with the top face 65 to define a cutting edge 80. While the top face 65 of the insert 45 illustrated in FIGS. 1 and 2 is circular, it should be understood this shape is merely one geometry of many geometries suitable for use with the subject invention.

The insert 45 may be made of any material suitable for cutting in metalworking operations; however, for high speed applications an insert having relatively low mass may be desired and, therefore, an insert made of a ceramic based material be preferred.

The wedge cavity 60 is recessed within the peripheral wall 25 and is adjacent to the insert pocket 50 at the front end 30 of the body 15.

The wedge 55 may be moved within the wedge cavity 60 in a direction generally along the longitudinal axis 20. The wedge 55 has a foot 85 which contacts the top face 65 of the insert 45 to urge the insert 45 within the insert pocket 50.

Figure 4:
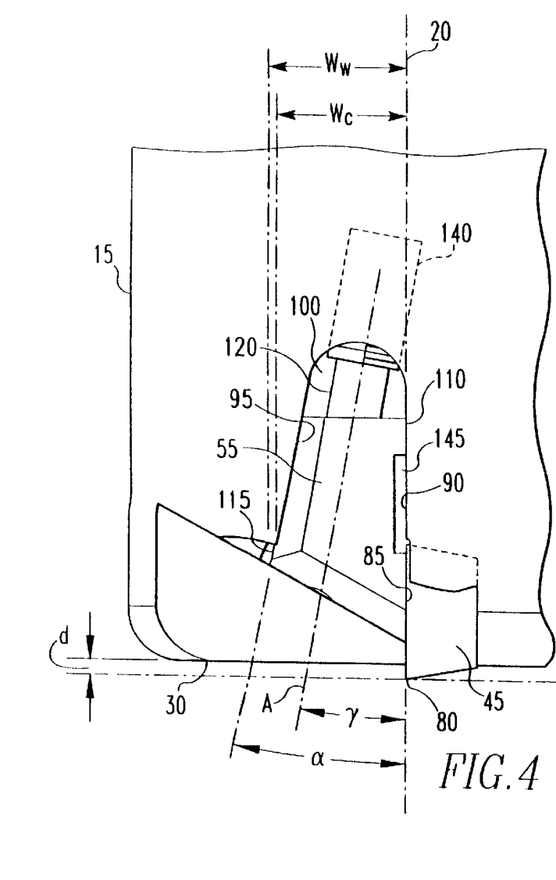
FIG. 4 illustrates a partial side view of the subject invention taken along arrows 4—4 in FIG. 3.

The wedge cavity 60 is comprised of a stabilizing wall 90 extending radially from the longitudinal axis 20 and a wedging wall 95 opposite the stabilizing wall 90 but angled relative to the stabilizing wall 90 to form an axial wedge angle $\alpha$ (FIG. 4) with the stabilizing wall 90 such that the width of the wedge cavity 60 when viewed in FIG. 4 decreases with distance away from the front end 30 culminating with an inner surface 100 connecting the stabilizing wall 90 and the wedging wall 95. A floor 105 defines the surface connecting the stabilizing wall 90, wedging wall 95 and inner surface 100. The axial wedge angle $\alpha$ may have a value between 5° and 15° with a preferred angle of 10°.

The wedge 55 has a base 110 on the same side as foot 85 which is a generally flat surface which contacts the stabilizing wall 90 of the wedge cavity 60. The wedge 55 also has a wedging side 115 with a flat surface which contacts the wedging wall 95 of the wedge cavity 60. The maximum width $W_w$ (FIG. 4) of the wedge 55 is greater than the maximum width $W_c$ of the wedge cavity 60 such that when the wedge 55 is urged within the wedge cavity 60, the foot 85 is forced against the top face 65 of the insert 45 to secure the insert 45 within the insert pocket 50.

The wedge 55 is urged into and out of the wedge cavity 60 by a screw 120 which may, as illustrated in FIG. 2, have a wedge section 125 with threads of one pitch and a body section 130 with threads of another pitch. The wedge section 125 is threadably engaged with mating threads to a threaded bore 135 extending through the wedge 55 along a wedge axis A formed at a screw angle Y (FIG. 4) with the longitudinal axis 20 of between 5° and 15° and preferably 10°. The body section 130 of the screw 120 is engaged with mating threads extending through a threaded bore 140 within the body 15 at the wedge cavity inner surface 100 along the wedge axis A. The different thread pitches of the wedge section 125 and the body section 130 of the screw 120 permit the wedge 55 to be urged into the wedge cavity 60 to secure the insert 45 within the insert pocket 50 and may also be used to urge the wedge 55 away from the wedge cavity 60 when under some circumstances the wedge 55 sticks within the wedge cavity 60. Without such a feature, removal may be difficult.

Between the foot 85 and the base 110 of the wedge 55 may be an indent 145 which provides an area of non-contact between the stabilizing wall 90 and the insert 45 when the wedge 55 is in the clamped position.

When the wedge is moved to the unclamped position, there must be sufficient clearance between the foot 85 of the wedge 55 and the top face 65 of the insert 45 to permit easy removal of the insert 45 from the pocket 50. Therefore, the screw angle Y not only permits the wedge 55 to travel in a direction parallel to the wedging wall 95 but also permits the wedge 55 to be laterally distanced from the insert pocket 60 to enable removal of the insert 45.

As illustrated in FIG. 3, the angle the wedge foot 85 forms with the wedging side 115 of the wedge 55 in the radial direction is the radial wedge angle $\beta$. A positive value of the radial wedge angle $\beta$ provides a wedge cavity 60 which narrows with radial distance from the longitudinal axis 20. By this design, rotation of the body 15 about the longitudinal axis 20 will create a centrifugal force urging the wedge 55 radially outward which in turn will generate a greater wedging force against the insert 45. Additionally, this will act as a positive restraint to the clamp wedge 55 thereby allowing higher rotational velocities of the body 15.

The axial wedge angle $\alpha$ and the radial wedge angle $\beta$ provide a "double angle" wedge which promotes clamping by tightening of the screw 120 and by rotation of the body 15. This feature provides excellent retention of the wedge 55 during high speed rotation of the milling cutter 10.

Figure 5:
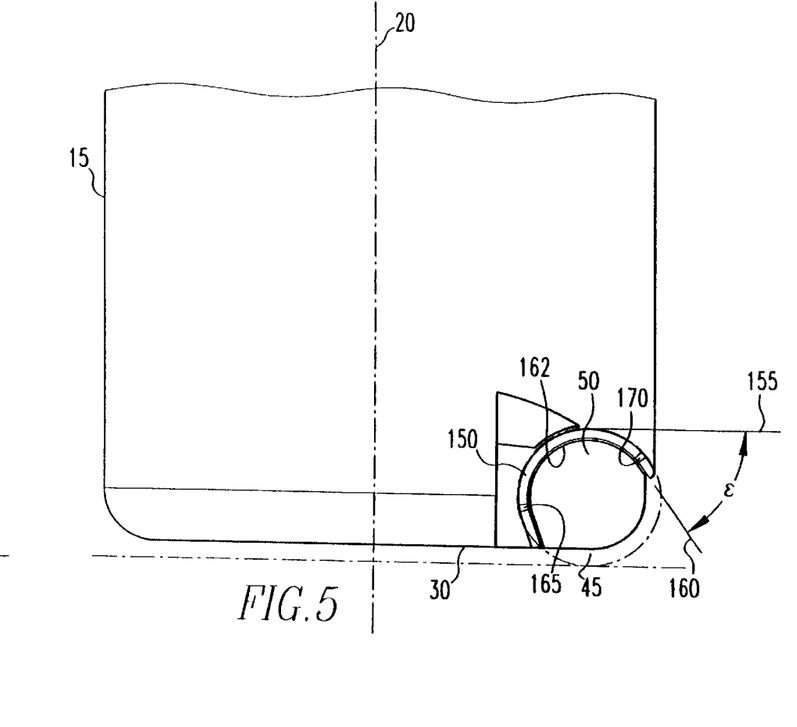
FIG. 5 illustrates a side view of the subject invention taken along arrows 5—5 in FIG. 3.

The insert pocket 50 also has associated with it features that promote positive retention of the insert 45. Specifically, FIGS. 2 and 5 illustrate features of the pocket 50 that will now be discussed. Although inserts of a shape other than the circular insert 45 illustrated in FIG. 2 may be used with the milling cutter 10 of the subject invention, for purposes of illustration the circular insert 45 will be addressed.

When the body 15 is rotated about longitudinal axis 20, the centrifugal force upon the insert 45 urges it radially outwardly. While the clamping mechanism utilizing the wedge 55 and the wedge cavity 60 restrains the insert 45 in a fashion suitable for most applications, for high speed applications it may be desirable to extend the side 150 (FIG. 5) of the insert pocket 50 around the insert 45 such that the side 150 of the pocket opposes the centrifugal forces acting upon the insert 45. For that reason the side of the pocket 150, which is arcuate to accommodate the circular insert 45, is circumscribed by an arc which extends beyond the point on the side 150 of the pocket 50 that is tangent to a line extending perpendicular to the longitudinal axis 20. As an example, as illustrated in FIG. 5, the capture angle $\epsilon$ defined between a line 155 perpendicular to the longitudinal axis 20 and tangential to the side 150 and a line 160 which is a projection of the pocket wall 162 may be between 10° and 80° and is preferably 55°.

Because it is extremely difficult to manufacture the insert pocket 50 to contact the insert 45 along the entire arc of the side 150, the side 150 of the pocket 50 is produced with a radius which is slightly smaller than the radius of the insert 45. By doing so, the insert 45 will contact the pocket 50 along two lines of contact 165 and 170. The pocket wall 162 may be conical to accommodate the conical side wall 65 of the insert 45. Furthermore, the radius of the conical pocket wall 162 at a point within the insert pocket 50 may be less than the radius of the conical side wall 65 of the insert 45 at a corresponding point by an amount of approximately 0.005 inches.

Figure 6:
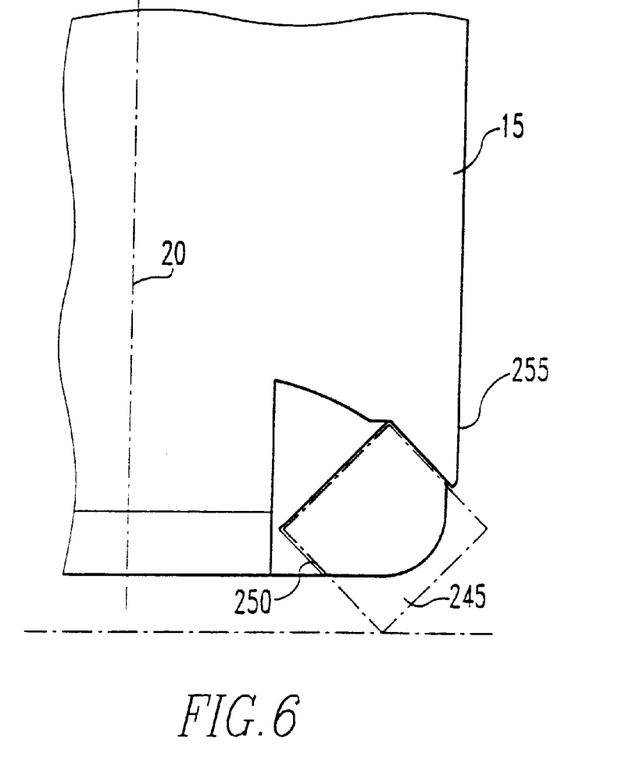
FIG. 6 illustrates a sketch of an insert pocket with a shape to accommodate a square insert.

Although the insert 45 has a generally circular shape, the subject invention is not limited to circular inserts and, as a result, any insert capable of being clamped within a pocket conformed to that insert is suitable for this invention. As illustrated in FIG. 6, a square insert 245, illustrated in phantom, is captured within an insert pocket 250 and a portion 255 of the cylindrical body 15 extends over a radial projection of the insert 245 to provide resistance to centrifugal forces acting upon the insert 245 when the body 15 is rotated about the longitudinal axis 20. It should be appreciated that any number of geometric configurations may be suitable for use in the cutter body 15 since the insert pocket may be shaped to accommodate any such variety with a portion extending to resist centrifugal forces to which the insert is subjected.

Figure 7:
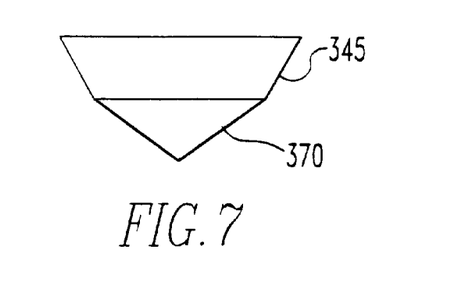
FIG. 7 illustrates a sketch of an insert having a conical base.

What has been discussed so far are inserts having a flat top face 65 and a flat bottom face 70 as illustrated in FIG. 2. As illustrated in FIG. 7, the insert 345 may have a pointed or conical bottom surface 370 which would fit into a matching shape within the insert pocket (not shown). Additionally, the insert 345 may have a star shaped bottom surface, or any other suitable shape, which would then fit into a matching shape within the insert pocket.

The cutting edge 80 of the insert 45 illustrated in FIG. 3 is parallel to a radial line extending outward from the longitudinal axis 20 and therefore has a radial rake angle of 0°. The cutting edge 80 of the insert 45 illustrated in FIG. 4 is parallel to the longitudinal axis 20 and therefore has an axial rake angle of 0°. The insert 45 may be angled such that either or both of the radial rake angle and the axial rake angle are non-zero.

Figure 8:
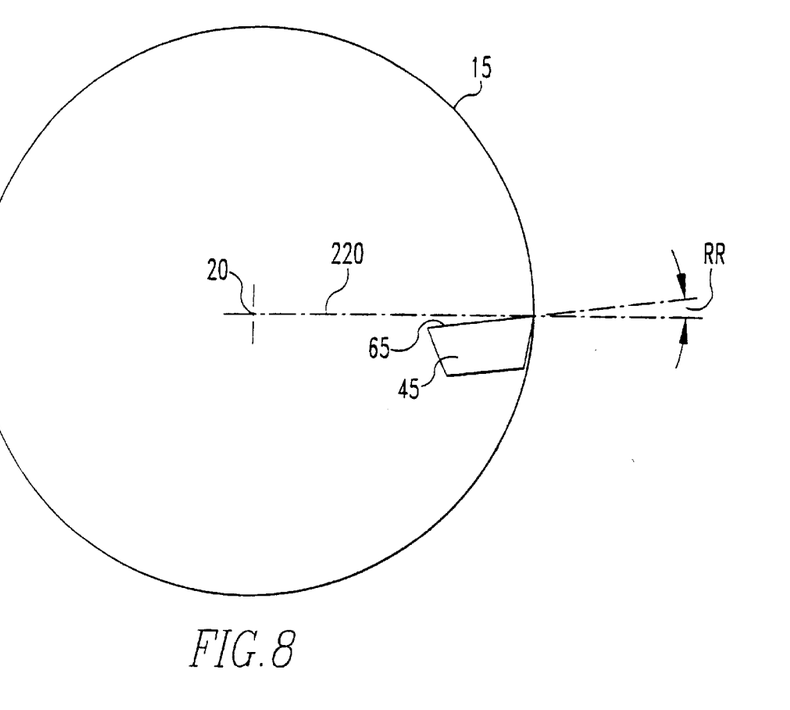
FIG. 8 illustrates a sketch of an insert showing a radial rake angle.

FIG. 8 illustrates a schematic of the same insert 45 shown in FIG. 3 but oriented at a positive radial rake angle RR. The radial rake angle RR is measured from a radial line 220 extending from the longitudinal axis 20 and a line extending across the top surface 65 of the insert 45. The radial rake angle RR may have a value between −20° and +30°.

Figure 9:
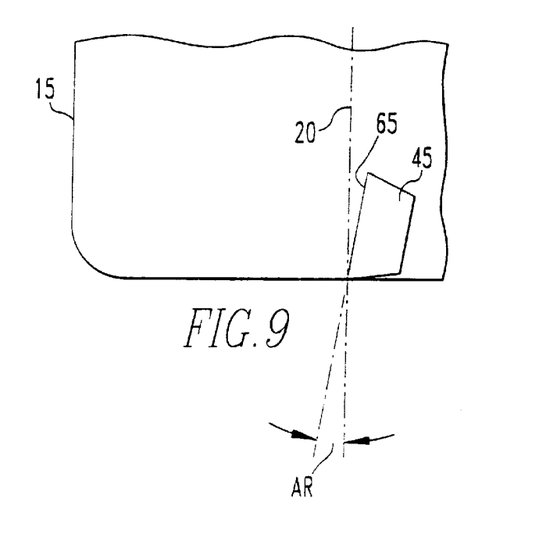
FIG. 9 illustrates a sketch of an insert showing an axial rake angle.

Furthermore, as illustrated in FIG. 9, which is a schematic oriented in a fashion similar to that of FIG. 4, the axial rake angle AR, defined by a line extending along the longitudinal axis 20 and a line extending across the top face 65 of the insert 45, may be between −20° and +30°.

As illustrated in FIG. 4, the distance d between the lowermost point of the cutting edge 80 of the insert 45 and the front end 30 of the cylindrical body 15 may be approximately 0.100 to 0.250 inches.

While a typical application of the milling cutter 10 herein described is for use purely in lateral cuts associated with an end mill, it is entirely possible to adjust the distance d to define a cavity so that the milling cutter 10 would be suitable for ramping and plunging operations including helical interpolation to define a hole within a workpiece.

The present invention may, of course, be carried out in specific ways other than those herein set forth without departing from the spirit and the essential characteristics of the invention. The present embodiments are therefore to be considered in all respects as illustrative and not restrictive, and all changes coming within the meaning and equivalency range of the appended claims are intended to be embraced therein.

What is claimed is:

1. A cutting tool comprising a cylindrical body with a front end and a back end and having a peripheral wall with a longitudinal axis and at least one insert mount assembly about the peripheral wall of the body, wherein each insert mount assembly is comprised of:
   a) an insert pocket recessed within the peripheral wall at the front end of the tool;
   b) an insert positioned within the insert pocket, wherein the insert has a top face, a bottom face and a side wall therebetween which intersect with the top face to define a cutting edge;
   c) a wedge cavity recessed within the wall and adjacent to the insert pocket at the front end of the tool;
   d) a wedge positioned within the wedge cavity having a foot for contacting the top face of the insert and urging the insert within the insert pocket with a clamping force;
   e) wherein the wedge cavity has an inner surface, a wedging wall and a stabilizing wall opposite the wedging wall and wherein the wedging wall and the stabilizing wall converge in a direction from the front end to the back end of the body to define an axial wedge angle (α) such that when the wedge, which has a wedging side and stabilizing side conforming to the wedging wall and stabilizing wall of the wedge, respectively, is moved toward the cavity inner surface, the foot of the wedge compresses against the face of the insert with increasing clamping force; and
   f) wherein the wedging wall and the stabilizing wall of the wedge cavity furthermore converge as they extend in a direction generally radially outward to the body to define a radial wedge angle (β) such that the wedge is captured and any radially outward movement of the wedge increases the clamping force upon the insert face.

2. The cutting tool according to claim 1, wherein the insert pocket is generally radially oriented and is partially enclosed along the periphery of the body to capture the insert in the radial direction.

3. The cutting tool according to claim 2, wherein the insert pocket is conical and the insert, which is mateable with the pocket, has a conical base.

4. The cutting tool according to claim 3, wherein the radii of the conical surface of the insert pocket are less than the radii of the conical surface of the insert.

5. The cutting tool according to claim 4, wherein the radii of the conical surface of the insert pocket is less than the radii of the conical surface of the insert by a value of about 0.005 inches at each radius.

6. The cutting tool according to claim 3, wherein the insert contacts the insert pocket along two lines on the pocket.

7. The cutting tool according to claim 2 wherein the insert pocket radially captures the insert with a portion of the body which extends over the insert and defines a capture angle ε between a line extending radially from the longitudinal axis and a line extending from the insert pocket at the peripheral wall.

8. The cutting tool according to claim 7 wherein the capture angle is between 10° and 80°.

9. The cutting tool according to claim 8 wherein the capture angle is approximately 55°.

10. The cutting tool according to claim 1, wherein the axial wedge angle (α) is between 5° and 15°.

11. The cutting tool according to claim 1, wherein the axial wedge angle (α) is 10°.

12. The cutting tool according to claim 1, wherein the radial wedge angle (β) is between 5° and 15°.

13. The cutting tool according to claim 1, wherein the radial wedge angle is 10°.

14. The cutting tool according to claim 1, wherein the stabilizing side of the wedge has at one end a base surface which is mateable with the stabilizing wall of the cavity, at the other end a foot which is compatible with the insert face, and an indent therebetween for clearance between the foot and base of the wedge.

15. The cutting tool according to claim 1, wherein the wedge is secured within the wedge cavity by a screw extending through a bore along an axis in the wedge and threadably engaged within a threaded bore, co-axial with the wedge bore, extending into the cavity inner surface.

16. The cutting tool according to claim 15, wherein the screw is double threaded and one set of screw threads engages the bore within the cavity inner surface while the second set of screw threads engages the wedge.

17. The cutting tool according to claim 16, wherein the axis defining the wedge bore and the cavity inner surface bore forms a screw angle (Y) with the longitudinal axis.

18. The cutting tool according to claim 17, wherein the screw angle (Y) may be between 5° and 15°.

19. The cutting tool according to claim 18, wherein the screw angle (Y) is 10°.

20. The cutting tool according to claim 1, wherein the insert is oriented within the insert pocket so the insert top face forms a radial rake angle between −20° and +30°.

21. The cutting tool according to claim 1, wherein the insert is oriented within the insert pocket so the insert top face forms an axial rake angle between −20° and +30°.

22. The cutting tool according to claim 1, wherein the insert has a flat bottom which is received within a flat bottom of the insert pocket.

23. The cutting tool according to claim 1, wherein the insert has a v-shaped bottom which is received within a compatible v-shaped bottom of the insert pocket.

24. The cutting tool accordidng to claim 1 further comprising a bore extending through the length of the cylindrical body along the longitudinal axis.

25. The cutting tool according to claim 1, wherein there is a plurality of insert mounting assemblies symmetrically positioned about the peripheral wall of the body.

26. A cutting tool comprising a cylindrical body with a front end and a back end and having a peripheral wall with a longitudinal axis and at least one insert mount assembly about the peripheral wall of the body, wherein each insert mount assembly is comprised of:
   a) an insert pocket recessed within the peripheral wall at the front end of the tool for receiving a cutting insert having a top face, a bottom face and side wall therebetween which intersects with the top face to form a cutting edge;
   b) a wedge cavity recessed within the wall and adjacent to the insert pocket at the front end of the tool;
   c) a wedge positioned within the wedge cavity having a foot for contacting the top face of the insert and urging the insert within the insert pocket with a clamping force;
   d) wherein the wedge cavity has an inner surface, a wedging wall and a stabilizing wall opposite the wedging wall and wherein the wedging wall and the stabilizing wall converge in a direction from the front end to the back end of the body to define an axial wedge angle ($\alpha$) such that when the wedge, which has a wedging side and stabilizing side conforming to the wedging wall and stabilizing wall of the wedge, respectively, is moved toward the cavity inner surface, the foot of the wedge compresses against the face of the insert with increasing clamping force; and
   e) wherein the wedging wall and the stabilizing wall of the wedge cavity furthermore converge as they extend in a direction generally radially outward to the body to define a radial wedge angle ($\beta$) such that the wedge is captured and any radially outward movement of the wedge increases the clamping force upon the insert face.

* * * * *